Patented Sept. 26, 1933

1,927,961

UNITED STATES PATENT OFFICE 1,927,961

PROCESS OF PREPARING LEVO-1-PHENYL-2-METHYLAMINO-PROPANOL-1

Friedrich Stolz and Julius Hallensleben, Frankfort-on-the-Main, Germany, assignors to Winthrop Chemical Company, Inc., New York, N. Y., a corporation of New York No Drawing. Application July 10, 1930, Serial No. 467,129, and in Germany August 31, 1929

3 Claims. (Cl. 260—128.5)

The present invention relates to a process of preparing optically active 1-phenyl-2-methylamino-propanols-1.

We have found that the therapeutically very important levo-1-phenyl - 2 - methylamino - propanol-1 which is identical with the natural ephedrine, can easily be obtained in an excellent yield, by mixing at a suitable temperature molecular quantities of synthetically prepared base of dextro-levo - phenylpropanol - methylamine in an ethyl-alcoholic solution with dextrotartaric acid. Instead of ethyl-alcohol also other solvents such as propyl-alcohol etc. and water may be used. Almost all of the dextro-bitartrate of dextro-1-phenyl-2-methylamino-propanol-1 which is more difficultly soluble in alcohol crystallizes from the ethyl-alcoholic solution, whereas the dextro-bitartrate of levo-1-phenyl-2-methylamino - propanol-1 remains in solution. The levo-base is separated from the solution in the usual manner and is then separated from admixed racemic base for instance by dissolving in an acid the levo-1-phenyl-2 - methylamino - propanol - 1 obtained from the mother liquor and treating the neutral solution with the quantity of ammonium oxalate required for the racemic base. The racemic base is thus precipitated in the form of the oxalate, while the levo-1-phenyl-2-methyl-amino- propanol-1 remains in the mother liquor. On working up these mother liquors a strongly rotary levo-1-phenyl-2-methyl-amino-propanol-1 is obtained, which, when transformed into the hydrochloride and recrystallized, has a rotation of $$\left[\alpha\right]_D^{20} = -34.5°.$$

This separation may also be effected by treating the optically active 1-phenyl-2-methylamino-propanol-1 contaminated by racemic base with organic or inorganic acids in suitable solvents, for instance by treating the mixture of racemic base and optically active base, suspended in water, with oxalic acid.

Another procedure is to mix with alkali the mixture of levo-base and racemic base in the form of their salts, the portions first precipitating being more strongly rotary than those precipitated later on. For complete separation, however, this operation must be repeated several times.

The following examples serve to illustrate the invention, but they are not intended to limit it thereto.

(1). 430 grams of dextro-levo-1-phenyl-2-methylamino-propanol-1 and 400 grams of dextro-tartaric acid are dissolved in 1000 grams of alcohol and the solution is allowed to stand until crystallization occurs. After 3–4 days the precipitated dextro-tartrate of dextro-1-phenyl-2-methylamino-propanol-1 is filtered by suction. The mother liquors are freed from alcohol and the remaining tartrate of 1-phenyl-2-methylamino-propanol-1 is transformed into its hydrochloride. There are obtained about 300 grams of phenylpropanol-methylamine-hydrochloride with a rotation of $\alpha = -0.53°$;

$$\left[\alpha\right]_D^{20} = -13.25°;$$

As for a 100 per cent. levo-1-phenyl-2-methylamino-propanol-1 the specific rotation is $$\left[\alpha\right]_D^{20} = -34.5°,$$

the said 300 grams of 1-phenyl-2-methylamino-propanol-1, which have a specific rotation of only $$\left[\alpha\right]_D^{20} = -13.25°;$$

contain 38–39 per cent. of a 100 per cent. levo-1-phenyl- 2 -methylamino - propanol-1. These 300 grams of the hydrochloride, therefore, contain about 39 per cent. i. e.; 117 grams of the hydrochloride of the pure levo-base. In order to separate the racemic compound from the 183 grams of the hydrochloride of racemic base calculated on this base to be present, the racemic compound is dissolved in about 900 cc. of water and warm ammonium oxalate solution of 10% strength (630 grams in all) is introduced drop by drop. When all the ammonium oxalate solution has been added, the precipitated dextro-levo - 1 - phenyl-2-methylamino-propanol-1-oxalate is filtered by suction and the levo-1-phenyl-2-methylamino-propanol-1 is extracted with ether from the mother liquors, after addition of excess of alkali, and transformed into the hydrochloride. After recrystallization from alcohol of 96 per cent. strength the levo-1-phenyl-2-methylamino-propanol-1-hydrochloride is obtained having a rotation of $\alpha = -1.38°$;

$$\left[\alpha\right]_D^{20} = -34.5°.$$

The hydrochloride melts at 214° C.–215° C.

Instead of ammonium oxalate, other oxalates may be used for the precipitation; furthermore the bitartrate of 1-phenyl-2-methylamino-propanol-1, remaining after distillation of the alcohol, may directly be used, dissolved in water and neutralized, for the precipitation of dextrolevo-1-phenyl-2-methylamino-propanol-1 with aid of an oxalate.

In the following examples the fractions obtained according to Example 1 by separating with tartaric acid and still contaminated by racemic base, are used as starting materials.

(2). 20 grams of levo-1-phenyl-2-methylamino-propanol-1-hydrochloride having an initial rotation of $$\left[\alpha\right]_D^{20} = -17.25°$$

are dissolved in 60 cc. of water. This solution is rendered alkaline by addition of 100 cc. of normal alkaline lye. Nearly all of the base remains in solution. The whole is then treated by slowly adding, while stirring, 3.2 grams of oxalic acid dissolved in 32 cc. of water. The precipitated oxalate of 1-phenyl-2-methylamino-propanol-1 is filtered by suction. It is only feebly levo-rotatory. The levo-base is extracted with ether from the mother liquors and transformed into the hydrochloride. The hydrochloride obtained is levo-rotatory. When $$\left[\alpha\right]_D^{20} = -30.2°,$$

the specific rotation is further increased by recrystallization from alcohol of 96 per cent. strength to $$\left[\alpha\right]_D^{20} = -34.5°.$$

(3). 15 grams of levo-1-phenyl-2-methylamino-propanol-1 having an initial rotation of $$\left[\alpha\right]_D^{20} = -17.25°$$

are dissolved in 30 grams of acetone. 4.5 grams of alcoholic hydrochloric acid of about 34% strength are introduced into the solution drop by drop, while stirring. The precipitated levo-1-phenyl-2-methylamino-propanol-1 hydrochloride is filtered and well washed with ether. The rotation of the 1-phenyl-2-methylamino-propanol-1 hydrochloride thus obtained is:

$$\left[\alpha\right]_D^{20} = -30°.$$

By recrystallizing from alcohol of 96 per cent. strength the rotation is raised to $$\left[\alpha\right]_D^{20} = -34.5°.$$

(4). 15 grams of levo-1-phenyl-2-methylamino-propanol-1 of a specific rotation $$\left[\alpha\right]_D^{20} = -17°$$

are dissolved in 25 cc. of alcohol and the solution is precipitated with 2.3 grams of sulfuric acid dissolved in 10 cc. of alcohol. The precipitated sulfate is filtered by suction, it is feebly levo-rotatory. The alcohol is distilled off from the mother liquors, the residue is dissolved in ether and transformed into the hydrochloride. The rotation is:

$$\left[\alpha\right]_D^{20} = -25°.$$

(5). 20 grams of levo-1-phenyl-2-methylamino-propanol-1 hydrochloride (initial rotation of $$\left[\alpha\right]_D^{20} = -17.25°),$$

are dissolved in 60 cc. of water and 2.6 grams of sodium carbonate, dissolved in 26 grams of water, are introduced drop by drop. The precipitated levo-1-phenyl-2-methylamino-propyl-1 is extracted with ether and the base dissolved therein precipitated in the form of the hydrochloride with alcoholic hydrochloric acid. The levo-1-phenyl-2-methylamino-propanol-1 hydrochloride obtained has a higher rotation than that of the parent material.

In the following claims the reaction of a salt of an organic acid upon the solution of a salt, e. g. of the hydrochloride, of the impure levo-1-phenyl-2-methylamino-propanol-1 base is equivalent to the reaction of the organic acid upon the free base in the presence of a solvent.

We claim:

1. In the manufacture of levo-1-phenyl-2-methylamino-propanol-1 by resolving dextro-levo-1-phenyl-2-methylamino-propanol-1 by means of dextro-tartaric acid the steps which comprise freeing the impure levo-base, obtained as product of the resolution, from admixed racemic base, by precipitating the racemic base by addition of the requisite quantity of a soluble salt of oxalic acid to the solution of a salt of the impure base.

2. In the manufacture of levo-1-phenyl-2-methylamino-propanol-1 by resolving dextro-levo-1-phenyl-2-methylamino-propanol-1 by by means of dextro-tartaric acid the steps which comprise freeing the impure levo-base, obtained as products of the resolution, from the admixed racemic base by precipitating the racemic base by addition of the requisite quantity of the ammonium salt of oxalic acid to the aqueous solution of a salt of the impure base.

3. In the manufacture of levo-1-phenyl-2-methylamino-propanol-1 by resolving dextro-levo-1-phenyl-2-methylamino-propanol-1 by means of dextro-tartaric acid the steps which comprise freeing the impure levo-base, obtained as product of the resolution, from admixed racemic base by precipitating the racemic base by addition of the requisite quantity of the ammonium salt of oxalic acid to the aqueous solution of the hydrochloride of the impure base.

FRIEDRICH STOLZ.
JULIUS HALLENSLEBEN.